(No Model.)

I. M. SIMONIN.
PROCESS OF AND APPARATUS FOR TREATING GARBAGE.

No. 573,714. Patented Dec. 22, 1896.

Witnesses:
F. D. Goodwin
Frank E. Bechtold

Inventor:
Issac M. Simonin
By his Attorneys
Howson & Howson

United States Patent Office.

ISAAC M. SIMONIN, OF PHILADELPHIA, PENNSYLVANIA.

PROCESS OF AND APPARATUS FOR TREATING GARBAGE.

SPECIFICATION forming part of Letters Patent No. 573,714, dated December 22, 1896.

Application filed August 18, 1894. Serial No. 520,659. (No model.)

*To all whom it may concern:*

Be it known that I, ISAAC M. SIMONIN, a citizen of the United States, residing in Philadelphia, Pennsylvania, have invented certain Improvements in the Treatment of Garbage and in Apparatus Employed in Connection Therewith, of which the following is a specification.

My invention consists of a process and apparatus for the treatment, for the recovery of useful products therefrom, of wet garbage or other greasy material containing a large percentage of water, the process being in some respects allied to that set forth in Patent No. 466,579, granted to myself and C. F. Simonin on the 5th day of January, 1892.

The object of my present invention is mainly to expedite the treatment of the garbage and thereby render the process more economical than that forming the subject of said patent. This object I attain in the manner hereinafter set forth, reference being had to the accompanying drawings, in which—

Figure 1:
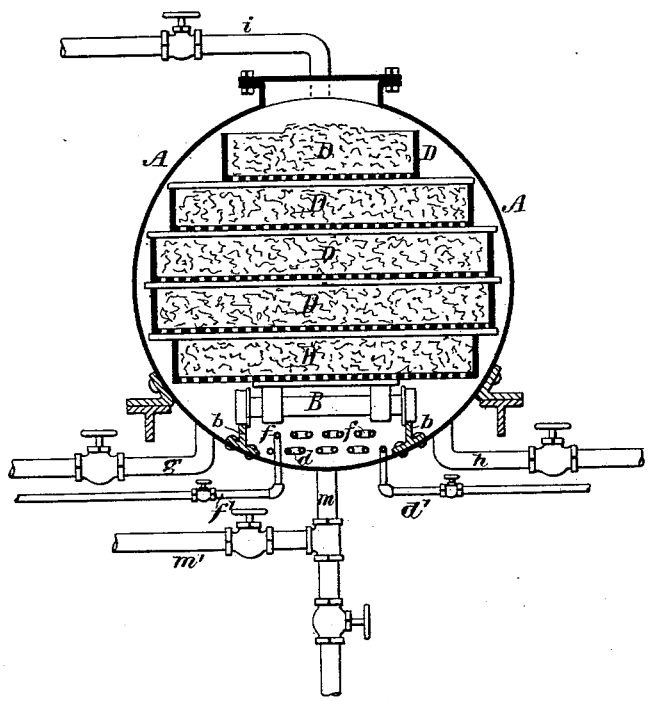
Figure 2:
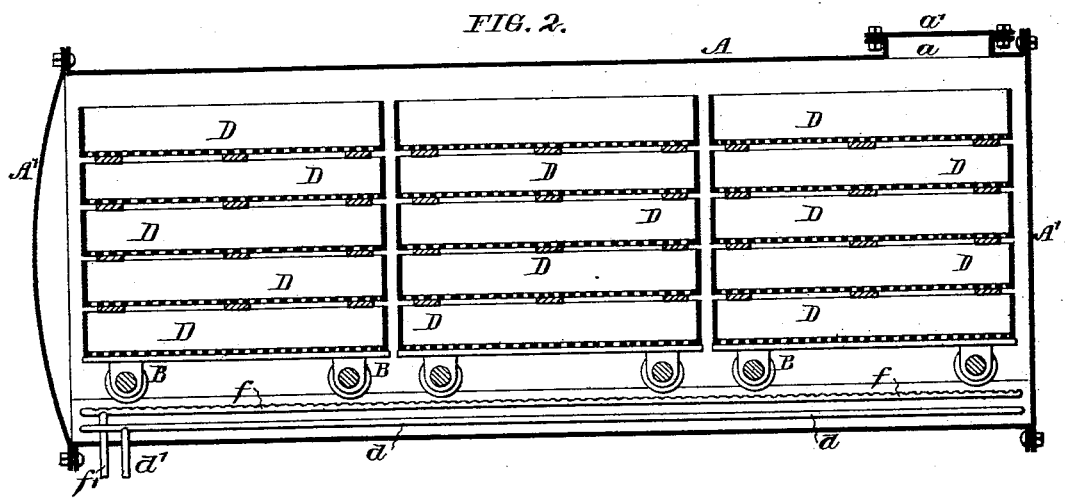

Figure 1 is a transverse section of apparatus which may be employed in carrying out my invention, and Fig. 2 is a longitudinal section of the same.

In carrying out the process forming the subject of the patent before referred to the garbage was deposited in a single mass in a treating vessel and there subjected to the action of a heated liquid reagent, such as naphtha, which has a less specific gravity than water, the function of this liquid reagent being twofold: first, to dissolve the grease and fat contained in the garbage, and, secondly, to displace the water in the mass, so that the latter would collect in the bottom of the vessel and could be drawn off therefrom, the naphtha, with the grease in solution therein, being carried to a still, where the separation of the naphtha from the grease was effected, provision being also made for heating the naphtha in the treating vessel, so as to facilitate its action in dissolving the grease, and further provision being made for the introduction of steam into the treating vessel after the withdrawal of the liquid naphtha and grease, so as to vaporize the naphtha still remaining in the mass of garbage. It has been found in practice that in carrying out this process the garbage must be treated a number of times in succession in order to effect the thorough elimination of the water therefrom for the purpose of reducing the mass remaining in the vessel to the desired dry and inodorous condition.

With the view of materially lessening the time of treatment I now subdivide the mass of garbage so that the agent employed in the treatment of the same can readily gain access to all parts of the mass, and I effect the elimination of all or almost all of the water from the mass by the use of a dry hot gaseous fluid, such as superheated steam or hot air, the temperature and dryness of which is materially in excess of that of the steam used for driving off the naphtha from the garbage, the effect of the action of this dry hot gaseous fluid being to vaporize the water contained in the garbage, the vapor escaping from the treating vessel and being conveyed to the condenser. This treatment with a dry hot gaseous fluid may, if desired, be relied upon to effect the melting of the fat or grease in the garbage, but it is by preference supplementary to the treatment of the garbage with heated naphtha, as above described.

In the drawings, A represents a treating vessel, which in the present instance is in the form of a cylinder having a detachable head A' at one end and having in the top an opening $a$, provided with a cover-plate $a'$, such opening being intended for the introduction of the garbage. The shape and construction of the treating vessel may, however, be varied to accord with the requirements in any particular case without departing from my invention.

To suitable rails $b$ within the treating vessel are adapted the wheels of trucks B, each of which carries a series of shallow pans or trays D, preferably perforated in the bottom, these trays being of a width limited by the diameter of the vessel and of such length that their size and weight will not preclude the ready handling of the same. The vessel has in the lower portion a steam-coil $d$, communicating through a valved pipe $d'$ with any available steam-generator, which also communicates through a valved pipe $f'$ with a perforated coil $f$ in the lower portion of the vessel. The said lower portion of the vessel also communicates through a valved pipe $g$ with a naphtha tank or vaporizer and through another valved pipe, $h$, with a superheater of any desired character. Thus, if steam is the heating agent employed, the superheater may consist of a pipe-coil located in the breeching or discharge-flue of the steam-generator; or, if air is employed as the heating agent, said pipe $h$ may communicate with any available form of air-heater, or it may receive the products of combustion direct from a suitable furnace.

The lower portion of the treating vessel communicates through a valved pipe $m$, having a valved branch $m'$, with any desired form of still or settler, and the upper portion of the vessel communicates through a valved pipe $i$ with a condenser of appropriate construction.

The process of treating the garbage is as follows: Into the empty vessel, closed at one end and having the cover-plate $a'$ removed, is run a truck B, having the lowermost of its series of trays thereon, the truck being stopped beneath the opening $a$, so that the garbage may be introduced through said opening until the tray D upon the truck has been filled. Another tray is then placed on top of the first, and after the same has been filled a third tray is placed thereon, and so on until the entire complement of trays carried by said truck has been properly filled, whereupon the truck with its loaded trays is pushed along to the end of the vessel and a second truck is run in beneath the opening $a$, and when this second truck has received its load of filled trays it is likewise pushed along into the vessel, so as to make room for a third truck, the operations being repeated until the vessel is filled. The front head A' and cover-plate $a'$ are then secured in place and the naphtha or naphtha-vapor is permitted to enter the vessel through the valved pipe $g$, the valves in the pipes $d'$, $f'$, $h$, $m$, and $m'$ being closed. When the proper amount of naphtha has entered the vessel, the valve in the pipe $g$ is closed and the naphtha may be heated or kept hot by the steam-coil $d$, the valve in the pipe $d'$ being opened, and after the treatment has continued for a proper length of time the valve in the pipe $m'$ may be opened, so as to draw off the water which has accumulated in the vessel, the valve in said pipe $m'$ being then closed and the naphtha, carrying with it the grease in solution, permitted to escape to the still or settler through the pipe $m$. After the naphtha, with the grease in solution therein, has been discharged from the vessel communication between the latter and the still or settler is cut off and the valve in the pipe $h$ is opened, so that the superheated steam, air, or other dry hot gaseous fluid is admitted to the vessel. This fluid so acts upon the masses of garbage as to vaporize the water or most of the water therein contained, this vapor escaping through the pipe $i$ to the condenser. After this treatment has been continued for a certain time the valve in the pipe $h$ is closed and the naphtha or naphtha-vapor again admitted to the vessel in order that it may act upon the garbage for the further extraction of grease therefrom, the naphtha and dissolved grease being then again run off to the still or settler. This is necessary in order to effect the desired result, that is to say, the complete extraction of the grease or fat from the garbage, steam being finally admitted from the coil $f$ in order to vaporize and carry off through the pipe $i$ the naphtha remaining in the garbage. For this purpose the direct action of steam is necessary, so that the naphtha can subsequently be recovered by condensation—hence the provision of the pipe $f$ in addition to the superheated steam or hot-air pipe $h$. The cover-plates $a'$ and A' are finally removed and the trays taken out, emptied, reinserted, and refilled prior to a repetition of the operation.

By the use of the dry hot gaseous fluid for effecting the vaporization of the water in the garbage a much less number of treatments of each charge is necessary than if the naphtha or other extraction process alone is used. Hence the operation is facilitated and the capacity of the plant very materially increased.

It will be observed that the entire treatment of the garbage is effected in one and the same apparatus without rehandling, so that the process is much more economical than those which involve the removal of the garbage from the extracting or digesting vessel after the extraction of the grease, in order that it may be subsequently deprived of its moisture by submitting it to a drying operation.

In some cases the treating vessel may be vertical instead of horizontal, the trays D in this case being lowered one after another into the vessel and lifted in succession from the vessel after the completion of the treatment.

Having thus described my invention, I claim and desire to secure by Letters Patent—

1. The mode herein described of treating wet garbage, said mode consisting in confining the garbage in a closed vessel and subjecting it therein to the action of a solvent of grease or fat, and on the withdrawal of the solvent with grease in solution therein, subjecting the mass to the action of a dry, hot, gaseous fluid, whereby water in the mass will be vaporized and carried off, then again subjecting the mass to the action of a solvent of grease or fat, and finally to the direct action of live steam whereby the solvent remaining in the mass will be vaporized and driven off, to be recovered from the steam by condensation, substantially as specified.

2. In apparatus for treating garbage, the combination of a vessel, means for closing the same, trucks adapted to be run into said vessel, and each having a series of trays mounted one above another, outlets for liquid and vapor from said vessel, an inlet for grease-extracting fluid, another inlet for a water-vaporizing fluid, a closed steam-coil and a steam-discharge pipe within the vessel, substantially as specified.

In testimony whereof I have signed my name to this specification in the presence of two witnesses.

ISAAC M. SIMONIN.

Witnesses:
WILLIAM A. BARR,
JOSEPH H. KLEIN.